United States Patent
Huke et al.

(10) Patent No.: US 11,610,452 B2
(45) Date of Patent: Mar. 21, 2023

(54) METHOD OF CALCULATING THE ODDS OF A SPORTS PLAY USING DATA FIDELITY

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/406,423

(22) Filed: Aug. 19, 2021

(65) Prior Publication Data
US 2022/0165126 A1    May 26, 2022

Related U.S. Application Data

(60) Provisional application No. 63/117,014, filed on Nov. 23, 2020.

(51) Int. Cl.
*G07F 17/32* (2006.01)
*G06F 16/245* (2019.01)
*G06Q 50/34* (2012.01)

(52) U.S. Cl.
CPC ........ *G07F 17/3234* (2013.01); *G06F 16/245* (2019.01); *G07F 17/3288* (2013.01); *G06Q 50/34* (2013.01)

(58) Field of Classification Search
CPC ............... G07F 17/323; G07F 17/3218; G07F 17/3288; G07F 17/3234; G06F 1/163; G06F 16/245; G06Q 50/34
See application file for complete search history.

(56) References Cited

U.S. PATENT DOCUMENTS

| | | | |
|---|---|---|---|
| 8,814,668 B1* | 8/2014 | Cornett | G07F 17/3244 463/28 |
| 2008/0064501 A1* | 3/2008 | Patel | G07F 17/3202 463/40 |

(Continued)

OTHER PUBLICATIONS

International Search Report and Written Opinion dated Jan. 11, 2022 in corresponding International Patent Application No. PCT/US2021/060568; 12 pages.

*Primary Examiner* — James S. McClellan
*Assistant Examiner* — Ross A Williams
(74) *Attorney, Agent, or Firm* — Maier & Maier, PLLC (57) ABSTRACT

The present disclosure provides a method of calculating the odds of a sports play using data fidelity by using a historical database and extracting the most recent play data and the previous play data, and comparing the extracted play to a set of rules to determine if the data is accurate and should be used to calculate wagering odds or if the data is inaccurate or contains an error which prompts action by the system, such as suspending the current wager market until the data that is received is accurate. Also, the method provides a method of calculating the odds of a sports play using data fidelity by using a historical database and extracting the most recent wager market data or wager odds data and the previous wager market data or wager odd data and compares the data to a set of rules to determine if the data is accurate and if not notifying an administrator of the wagering network or wagering platform of a systematic error or issue.

17 Claims, 3 Drawing Sheets

Base Module

(56) References Cited

U.S. PATENT DOCUMENTS

| | | | |
|---|---|---|---|
| 2012/0036162 A1* | 2/2012 | Gimbel | G06F 16/24549 707/783 |
| 2014/0278883 A1* | 9/2014 | Wang | G06Q 30/0234 705/14.26 |
| 2020/0111325 A1* | 4/2020 | Lockton | G07F 17/3288 |

* cited by examiner

Fig.1 A system for calculating the odds of a sports play using data fidelity

Fig.2 Base Module

Fig.3 Play Accuracy Module

Fig.4 System Accuracy Module

| Rule ID | Event Type | Rule | Action |
|---|---|---|---|
| Base12345 | Baseball | If Pitch Number Increases by 2 | Suspend Wager Market |
| Base6780 | Baseball | If Inning Increase by 2 | Do Not Allow Wager Market |
| - | - | - | - |
| Foot12345 | Football | If Down Increases by 2 | Suspend Wager Market |
| Foot0987 | Football | If Time Decreases by 1 minute and 30 seconds | Do Not Allow Wager Market |
| - | - | - | - |
| Bask4567 | Basketball | If time Decreases by 45 seconds | Suspend Wager Market |
| Bask9875 | Basketball | If Quarter Increases by 2 | Do Not Allow Wager Market |
| - | - | - | - |
| - | - | - | - |
| - | - | - | - |

Fig.5 Play Rules Database

| Rule ID | Rule | Action |
|---|---|---|
| Sys45632 | If Wager Profits Decrease by 80% | Suspend Wager Market, Notify Administrator |
| Sys3216 | If Wager Profits Increase by 90% | Suspend Wager Market, Notify Administrator |
| - | - | - |
| - | - | - |
| - | - | - |

Fig.6 System Rules Database

METHOD OF CALCULATING THE ODDS OF A SPORTS PLAY USING DATA FIDELITY

CROSS-REFERENCE TO RELATED APPLICATIONS

The present patent application claims benefit and priority to U.S. Provisional Patent Application No. 63/117,014 filed on Nov. 23, 2020, which is hereby incorporated by reference into the present disclosure.

FIELD

The present embodiments are generally related to play-by-play wagering on live sporting events.

BACKGROUND

An issue with wagering platforms and wagering applications is that the data in which the wager odds are calculated is often inaccurate.

Also, there are times when the live event data used to calculate wagering odds is incorrect or erroneous leading to inappropriate wager markets or odds that do not properly relate to the upcoming play.

Lastly, suppose a wagering platform or application receives incorrect or erroneous data. This can cause the wager markets that are based on the wagering platform or application to suffer unexpected losses or profits, leading to decreased user engagement and a lack of trust with the platform or application.

Thus, there is a need in the prior art to have a method to determine the credibility of the data received and the appropriate wager markets and odds.

SUMMARY

Methods, systems, and apparatuses for calculating odds of a sports play using data fidelity may be shown and described. In one embodiment, a method of ensuring accuracy of calculated odds on a sports wagering network can include filtering at least one database for live event data; extracting recent and historical play data and/or odds data from at least one database storing at least recent and historical play data and/or odds data; determining differences in recent and historical play and/or odds data through comparison; utilizing differences in the recent and historical play and/or odds data to initiate extraction of at least one play or system rule from a database governing the differences; executing a rule to suspend or disallow wager market activity on a sports wagering network and/or to notify an administrator; storing rules in at least one database; and displaying at least one message to an administrator.

In another embodiment, a system for ensuring accuracy of calculated odds on a sports wagering network can include a base module configured to initiate at least one play accuracy module and system accuracy module; a play accuracy module configured to regulate odds based on changes in live event play data by determining differences in stored data via comparison and utilizing those differences to initiate extraction and execution of at least one stored rule; a system accuracy module configured to regulate odds based on changes in wager profit data by determining differences in stored data via comparison and utilizing those differences to initiate extraction and execution of at least one stored rule; a play rules database configured to store play rule data; a system rules database configured to store system rule data; and a device configured to display a message.

BRIEF DESCRIPTIONS OF THE DRAWINGS

The accompanying drawings illustrate various embodiments of systems, methods, and various other aspects of the embodiments. Any person with ordinary skill in the art will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. The described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that specific circuits can perform the various sequence of actions described herein (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of the terminology used herein is provided.

An action refers to a specific play or specific movement in a sporting event. For example, an action may determine which players were involved during a sporting event. In some embodiments, an action may be a throw, shot, pass, swing, kick, and/or hit performed by a participant in a sporting event. In some embodiments, an action may be a strategic decision made by a participant in the sporting event, such as a player, coach, management, etc. In some embodiments, an action may be a penalty, foul, or other type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "bet" or "wager." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for certain amount or for a future time. A "bet" or "wager" can be made for being able to answer a question correctly. A "bet" or "wager" can be made within a certain period. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain to place bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that will be determined by a point spread or money line. The term "straight-up" means winning the game without any regard to the "point spread," a "money-line" bet. "Money line," "straight bet," and "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread." A handicap of the "point spread" value is given to the favorite team so bettors can choose sides at equal odds. "Cover the spread" means that a favorite wins an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread." The "opening line" means the earliest line posted for a particular sporting event or game. The term "pick" or "pick 'em" refers to a game when neither team is favored in an event or game. "Line," "cover the spread," "cover," "tie," "pick," and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total," "over," and "under" can be integrated into the embodiments in a variety of manners.

A "parlay" is a single bet that links together two or more wagers; to win the bet, the player must win all the wagers in the "parlay." If the player loses one wager, the player loses the entire bet. However, if they win all the wagers in the "parlay," the player receives a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay," "round robin," "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games, and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events. Typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both pitchers scheduled to start a game start. If they do not, the bet is deemed "no action" and refunded. The "run line" in baseball refers to a spread used instead of the money line. "Listed pitchers," "no action," and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle," "juice," vigorish," "vig," and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individuals that would deploy, for fees, and may be part of, or perform, various system elements or method steps in the embodiments.

Managed service user interface service is a service that can help customers (1) manage third parties, (2) develop the web, (3) perform data analytics, (4) connect thru application program interfaces and (4) track and report on player behaviors. A managed service user interface can be integrated into the embodiments in a variety of manners.

Managed service risk management service are services that assist customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land based on property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are services that help customers with (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat players to free bets, odds boosts, enhanced access, and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by always managing commission and availability. The "cash out" or "pay out" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth by creating and delivering actionable insights on performance to help customers to manage the sports gaming. Business Applications can be integrated into the embodiments in a variety of manners.

State-based integration allows for a given sports gambling game to be modified by states in the United States or other countries, based upon the state the player is in, mobile phone, or other geolocation identification means. State-based integration can be integrated into the embodiments in a variety of manners.

Game Configurator allows for configuration of customer operators to have the opportunity to apply various chosen or newly created business rules on the game as well as to parametrize risk management. The Game Configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery and licensing method in which software is accessed online via a subscription rather than bought and installed on individual computers. Software as a service can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support enable users to quickly obtain additional information about the content they see without any user-based input or search efforts. A short media clip (audio, video, or both) is selected to start the recognition. This clip could be selected from within a media file or recorded by a device. Through algorithms such as fingerprinting, information from the actual perceptual content is taken and compared to a database of reference fingerprints, wherein each reference fingerprint corresponds with a known recorded work. A database may contain metadata about the work and associated information, including complementary media. If the media clip's fingerprint is matched, the identification software returns the corresponding metadata to the client application. For example, during an in-play sports game, a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet"—which is a computer-generated data point—is placed above the player that is bet on. Augmented reality can be integrated into the embodiments in a variety of manners.

Some embodiments of this disclosure, illustrating all its features, will now be discussed in detail. It can be understood that the embodiments are intended to be open-ended in that an item or items used in the embodiments is not meant to be an exhaustive listing of such item or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

Figure 1:
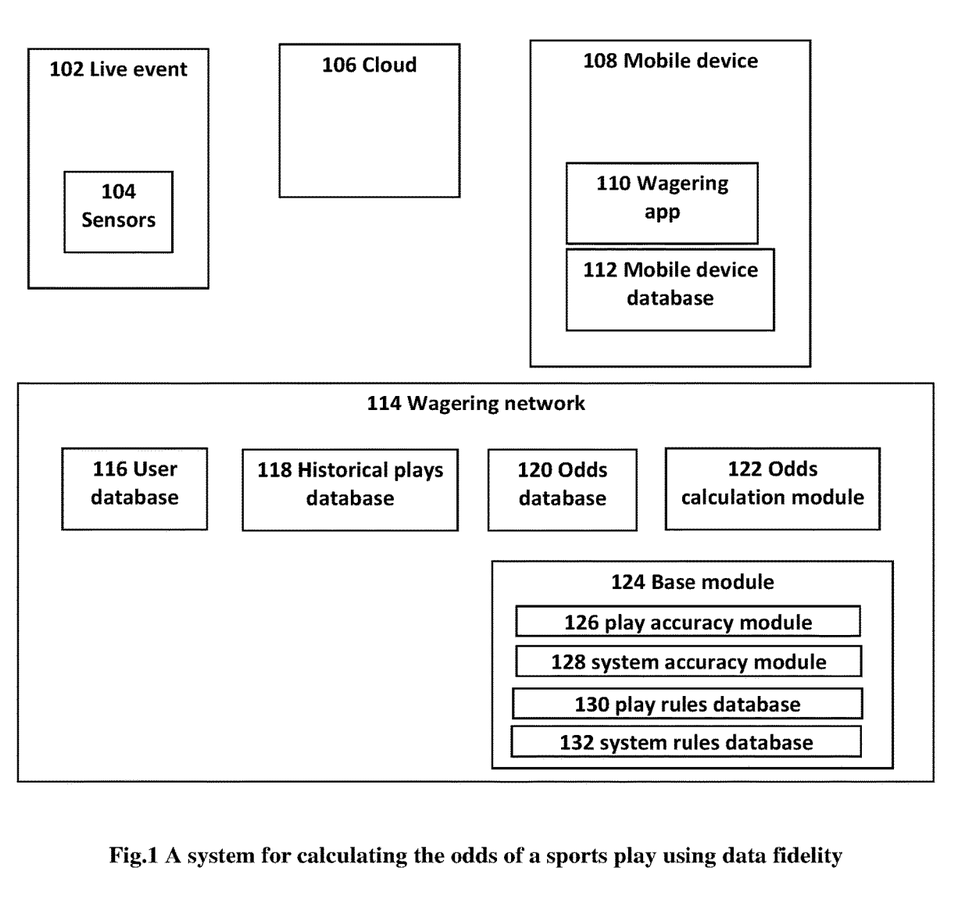
FIG. 1: illustrates a system for calculating the odds of a sports play using data fidelity, according to an embodiment.

FIG. 1 is a system for calculating the odds of a sports play using data fidelity. This system may include a live event 102, for example, a sporting event such as a football, basketball, baseball, or hockey game, tennis match, golf tournament, eSports, or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the Internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. The wagering network 114 can offer several SaaS managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include, but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include but is not limited to, a plurality of betting attributes such as at least one of the following: the live event 102, a team, a player, an amount of wager, etc. The user database 116 may include, but is not limited to, information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include data or metadata about the live event and/or historical plays, such as time, location, weather, previous plays, scores, winners, losers, opponent data, physiological data, team record data, etc. Further, embodiments may utilize an odds database 120—that contains the odds calculated by an odds calculation module 122—to display the odds on the user's mobile device 108 and take bets from the user through the mobile device wagering app 110.

Further, embodiments may include the odds calculation module 122, which utilizes historical play data to calculate odds for in-play wagers.

Further, embodiments may include a base module 124, which may begin with the base module 124 initiating the play accuracy module 126. For example, the play accuracy module 126 may filter the historical plays database 118 for the live event 102. The play accuracy module 126 may query the historical plays database 118 for the most recent play or entry. The play accuracy module 126 may extract the play data from the historical play database 118. The play accuracy module 126 may query the historical plays database 118 for the previous play data. The play accuracy module 126 may extract the previous play data from the historical plays database 118. The play accuracy module 126 may compare the extracted play data with the play rules database 130. The play accuracy module 126 may determine if a match exists between the extracted play data and the rules stored in the play rules database 130. If there is a match, the play accuracy module 126 may extract the corresponding rule from the play rules database 130. The play accuracy module 126 may execute the extracted rule from the play rules database 130. If there is no match or after the extracted rule is executed, the play accuracy module 126 may return to the base module 124. The base module 124 may initiate the system accuracy module 128. The system accuracy module 128 may filter the odds database 120 for the live event 102. The system accuracy module 128 may query the odds database 120 for the most recent wager market or odds. The system accuracy module 128 may extract the wager market data from the odds database 120. The system accuracy module 128 may query the odds database 120 for the previous wager market data. The system accuracy module 128 may extract the previous wager market data from the odds database 120. The system accuracy module 128 may compare the extracted wager market data with the system rules database 132. The system accuracy module 128 may determine if there is a match between the extracted wager market data and the rules stored in the system rules database 132. If there is a match, the system accuracy module 128 may extract the corresponding rule from the system rules database 132. The system accuracy module 128 may execute the extracted rule from the system rules database 132. If there is no match or after the extracted rule is executed, the system accuracy module 128 may return to the base module 124.

Further, embodiments may include a play accuracy module 126, which may begin with the base module 124 initiating the play accuracy module 126. The play accuracy module 126 may filter the historical plays database 118 for the live event 102. For example, if the live event 102 is the Boston Red Sox vs. the New York Yankees, the historical plays database 118 may be filtered for all historical plays for the Boston Red Sox vs. the New York Yankees. The play accuracy module 126 may query the historical plays database 118 for the most recent play or entry. For example, the most recent play may be in the Boston Red Sox vs. the New York Yankees event in the bottom of the second inning, with the number three batter up at the plate, such as J. D. Martinez, with one out and no runners on base, and five pitches have been thrown. The play accuracy module 126 may extract the play data from the historical play database 118. For example, the extracted play data may be the Boston Red Sox vs. the New York Yankees event in the bottom of the second inning, with the number three batter up at the plate, such as J. D. Martinez, with one out and no runners on base, and five pitches have been thrown. The play accuracy module 126 may query the historical plays database 118 for the previous play data. For example, the play accuracy module 126 may query the historical plays database 118 for the second most recent play, the second newest entry in the historical plays database 118, or the data entry previously entered before the most recent play. The play accuracy module 126 may extract the previous play data from the historical plays database 118. For example, the data extracted may be the Boston Red Sox vs. the New York Yankees event in the bottom of the second inning, with the number three batter up at the plate, such as J. D. Martinez, with one out and no runners on base, and three pitches have been thrown. The play accuracy module 126 may compare the extracted play data to the play rules database 130. For example, the play accuracy module 126 may compare the extracted play data to the play rules database 130 to determine the differences between the two data entries, such as the number of pitches increased since the most recent entry. The play accuracy module 126 may determine if there is an associated rule with the difference in data. Another example may be if the inning from the most recent data entry was the bottom of the fourth inning and the second most recent data entry has the live event 102 in the top of the second inning, meaning an increase of two innings. The play accuracy module 126 may determine if there is a match between the extracted play data and the rules stored in the play rules database 130. For example, if the number of pitches increased by two since the previous data entry, there may be a match with the data stored in the play rules database 130, thereby causing the corresponding action to be extracted and executed. Similarly, if the innings increased by two, there may also be a match to the data stored in the play rules database 130, thereby causing the corresponding action to be extracted and executed. If there is a match, the play accuracy module 126 may extract the corresponding rule from the play rules database 130. For example, if the number of pitches increased by two from the previous data entry and the most recent data entry, there may be a match, and the corresponding action may be to suspend the wagering market. For example, the wagering market may not offer wager odds to the user until there are no matches between the differences in the two data entries and play rules database 130 thereby ensuring that the data received by the wagering network 114 is correct and without error. The play accuracy module 126 may execute the extracted rule from the play rules database 130. For example, the corresponding rule or corresponding action may be to suspend the wagering market. In another example, the wagering market may not offer wager odds to the user until there were no matches between the differences in the two data entries and play rules database 130 thereby ensuring that the data being received by the wagering network 114 is correct and without error. If there is no match or after the extracted rule is executed, the play accuracy module 126 may return to the base module 124.

Further, embodiments may include a system accuracy module 128, which may begin with the base module 124 initiating the system accuracy module 128. The system accuracy module 128 may filter the odds database 120 for the live event 102. For example, the system accuracy module 128 may filter the odds database 120 for the live event 102 of the Boston Red Sox vs. the New York Yankees. The system accuracy module 128 may query the odds database 120 for the most recent wager market or odds. For example, the system accuracy module 128 may query the odds database 120 for the most recent wager market or odds offered for the live event 102, such as the in the second inning of the Boston Red Sox vs. the New York Yankees event with J. D. Martinez at-bat, the fifth pitch was a ball, resulting in the house or the wagering network 114 collecting $10,000. The system accuracy module 128 may extract the wager market data from the odds database 120. For example, the data extracted may be in the second inning in the Boston Red Sox vs. the New York Yankees event with J. D. Martinez at-bat, wherein the fifth pitch was a ball that resulted in the wagering network 114 collecting $10,000. The system accuracy module 128 may query the odds database 120 for the previous wager market data. For example, the system accuracy module 128 may query the odds database 120 for the wager odds data for the wagering market before the most recent wager market or the second most recent data entry in the odds database 120. For example, the data may be in the second inning in the Boston Red Sox vs. the New York Yankees event with J. D. Martinez at-bat, wherein the fourth pitch was a ball, resulting in the house or the wagering network 114 collecting $50,000. The system accuracy module 128 may extract the previous wager market data from the odds database 120. For example, the data extracted may be in the second inning in the Boston Red Sox vs. the New York Yankees event with J. D. Martinez at-bat, wherein the fourth pitch was a ball, resulting in the wagering network 114 collecting $50,000. The system accuracy module 128 may compare the extracted wager market data to the system rules database 132. For example, the system accuracy module 128 may compare the two extracted data entries in which the difference is on the fourth pitch where the house or wagering network 114 collected $50,000, and on the fifth pitch, where the house collected $10,000 on the wagers for the pitch to be a ball, which may be a decrease of 80% in collections or profits for the house. The system accuracy module 128 may determine if there is a match between the extracted wager market data and the rules stored in the system rules database 132. For example, the difference between the two data entries may be that the house profits decreased by 80%, so there may be a match between the two data entries and the data stored in the system rules database 132, which may result in the corresponding action to be extracted and executed. If there is a match, the system accuracy module 128 may extract the corresponding rule from the system rules database 132. For example, the difference between the two data entries may be that the house profits decreased by 80%, so there may be a match between the two data entries and the data stored in the system rules database 132, which may result in the corresponding action, such as the wagering market being suspended, or a system administrator being notified. The decrease in profits for the house or wagering network 114 may be because of incorrect or erroneous data received by the wagering network 114 to create the odds, thereby potentially resulting in inappropriate or incorrect wager odds that either make the house lose profits drastically or allow the house to collect profits drastically; this may in turn lower user engagement due to a lack of trust in the system. The system accuracy module 128 may execute the extracted rule from the system rules database 132. For example, the corresponding action may be to suspend the wagering market or notify an administrator to correct the wager odds or check the system to ensure that the data being received from the live event 102 is correct and without errors thereby potentially preventing further drastically increased or decreased profits for the wagering network 114. If there is no match or after the extracted rule is executed, the system accuracy module 128 may return to the base module 124.

Further, embodiments may include a play rules database 130. The play rules database 130 may contain the rule ID, such as Base12354, the event type, such as baseball, the rule, such as if the pitch number increases by two, and the action, such as suspend the wagering market. The play rules database 130 may be used in the process described in the play accuracy module 126, wherein the two most recent plays from a live event 102 are extracted from the historical plays database 118 and compared to the play rules database 130 to determine if the two extracted data entries match any of the rules listed and if so, execute the corresponding action. This comparison may prevent the wagering network 114 from using erroneous data from the live event 102, which may lead to the creation of inappropriate or wrong wagering odds or wagering odds that do not fully represent the current state of the live event 102. In some embodiments, the play rules database 130 may contain data for multiple sports or events such as baseball, football, soccer, hockey, tennis, golf, etc. In some embodiments, the play rules database 130 may contain other rules or actions that limit or suspend wager markets until the data being received is deemed correct, or if there is a continuous stream of incorrect data, then the play rules database 130 may contain an action to inform or notify a system administrator to correct the data being received or perform some other action to correctly create wagering odds for the live event 102.

Further, embodiments may include a system rules database 132. The system rules database 132 may contain the rule ID, such as Sys45632, the rule, such as if wager profits decrease by 80%, and the action, such as suspend the wagering market and notify a system administrator. The system rules database 132 may be used in the process described in the system accuracy module 128, wherein which the two most wager markets for the live event 102 are extracted from the odds database 120 and compared to the system rules database 132 to determine if the two extracted data entries match any of the rules listed and if so, execute the corresponding action. This comparison may prevent the wagering network 114 from using data from the live event 102 that may be erroneous, leading to the creation of inappropriate or wrong wagering odds or wagering odds that do not fully represent the current state of the live event 102. The system rules database 132 may contain rules based on potential system errors that may be caused by receiving incorrect or error-filled data from the live event 102 that may potentially have a drastic outcome on the profits or losses for the wagering network 114. This may lead the wagering network 114 to incorrectly losing large sums of profits or gaining profits incorrectly, thereby potentially leading to mistrust with users and loss of user engagement. In some embodiments, the system rules database 132 may contain other rules or actions that limit or suspend wagering markets until the data being received is deemed correct. If there is a continuous stream of incorrect data, the system rules database 132 may contain an action to inform or notify a system administrator to correct the data being received or perform some other action to correctly create wagering odds for the live event 102.

Figure 2:
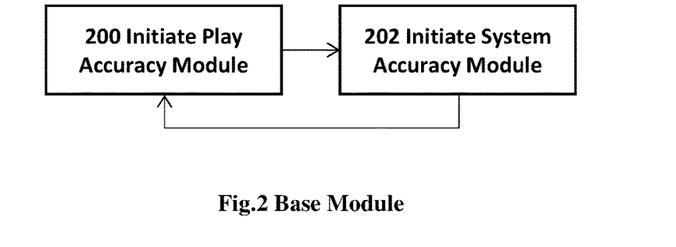
FIG. 2: illustrates a base module, according to an embodiment.

FIG. 2 illustrates the base module 124. The process may begin with the base module 124 initiating, at step 200, the play accuracy module 126. The base module 124 may then initiate, at step 202, the system accuracy module 128.

Figure 3:
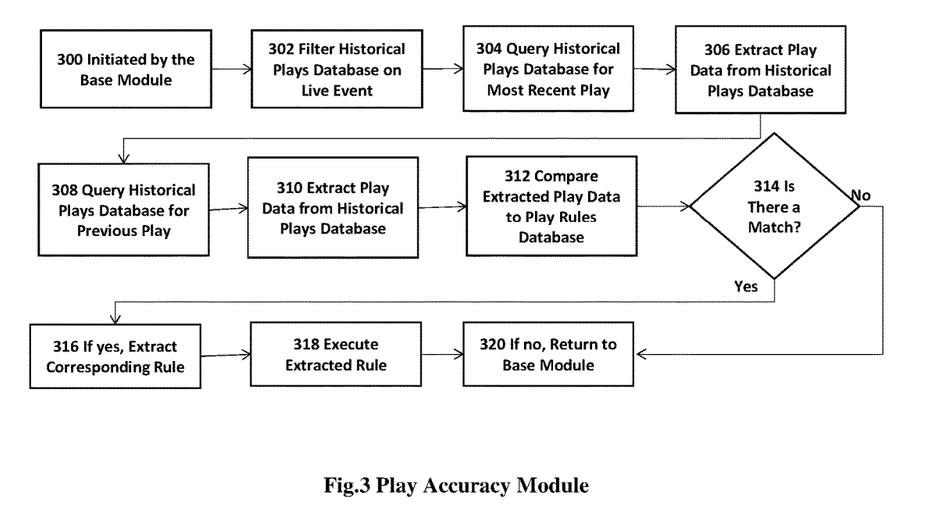
FIG. 3: illustrates a play accuracy module, according to an embodiment.

FIG. 3 illustrates the play accuracy module 126. The process may begin with the base module 124 initiating, at step 300, the play accuracy module 126. The play accuracy module 126 may filter, at step 302, the historical plays database 118 for the live event 102. For example, if the live event 102 is the Boston Red Sox vs. the New York Yankees, the historical plays database 118 may be filtered for all historical plays for the Boston Red Sox vs. the New York Yankees. The play accuracy module 126 may query, at step 304, the historical plays database 118 for the most recent play or entry. For example, the most recent play may be in the Boston Red Sox vs. the New York Yankees event in the bottom of the second inning, with the number three batter up at the plate, such as J. D. Martinez, with one out and no runners on base, and five pitches have been thrown. The play accuracy module 126 may extract, at step 306, the play data from the historical play database 118. For example, the extracted data may be the Boston Red Sox vs. the New York Yankees event in the bottom of the second inning, with the number three batter up at the plate, such as J. D. Martinez, with one out and no runners on base, and five pitches have been thrown. The play accuracy module 126 may query, at step 308, the historical plays database 118 for the previous play data. For example, the play accuracy module 126 may query the historical plays database 118 for the second most recent play, the second newest entry in the historical plays database 118, or the data entry previously entered before the most recent play. The play accuracy module 126 may extract, at step 310, the previous play data from the historical plays database 118. For example, the extracted data may be the Boston Red Sox vs. the New York Yankees event in the bottom of the second inning, with the number three batter up at the plate, such as J. D. Martinez, with one out and no runners on base, and three pitches have been thrown. The play accuracy module 126 may compare, at step 312, the extracted play data with the play rules database 130. For example, the comparison may determine the differences between the two data entries, such the number of pitches has increased by two or that the most recent entry has five pitches thrown and the previous entry from that has three pitches thrown. So, the two-pitch increase may be compared to the play rules database 130 to determine if there is an associated rule with the difference in data. Another example may be that the inning from the most recent data entry was the bottom of the fourth inning and the second most recent data entry has the event in the top of the second inning, which may be an increase of two innings. The play accuracy module 126 may determine, at step 314, if there is a match between the extracted play data and the rules stored in the play rules database 130. For example, if the number of pitches increased by two from the previous data entry and the most recent data entry, there may be a match to the data stored in the play rules database 130, and the corresponding action may be extracted and executed. Similarly, if the innings increased by two, there may also be a match to the data stored in the play rules database 130, and the corresponding action may be extracted and executed. If there is a match, the play accuracy module 126 may extract, at step 316, the corresponding rule from the play rules database 130. For example, if the number of pitches increased by two from the previous data entry and the most recent data entry, there may be a match, and the corresponding action may be to suspend the wagering market. For example, the wagering market may not offer wager odds to the user until there were no matches between the differences in the two data entries and play rules database 130 thereby ensuring that the data being received by the wagering network 114 is correct and without error. The play accuracy module 126 may execute, at step 318, the extracted rule from the play rules database 130. For example, the corresponding rule or corresponding action may be to suspend the wagering market. For example, the wagering market may not offer wager odds to the user until there were no matches between the differences in the two data entries and play rules database 130 to ensure that the data being received by the wagering network 114 is correct and without error. If there is no match or after the extracted rule is executed, the play accuracy module 126 may return, at step 320, to the base module 124.

Figure 4:
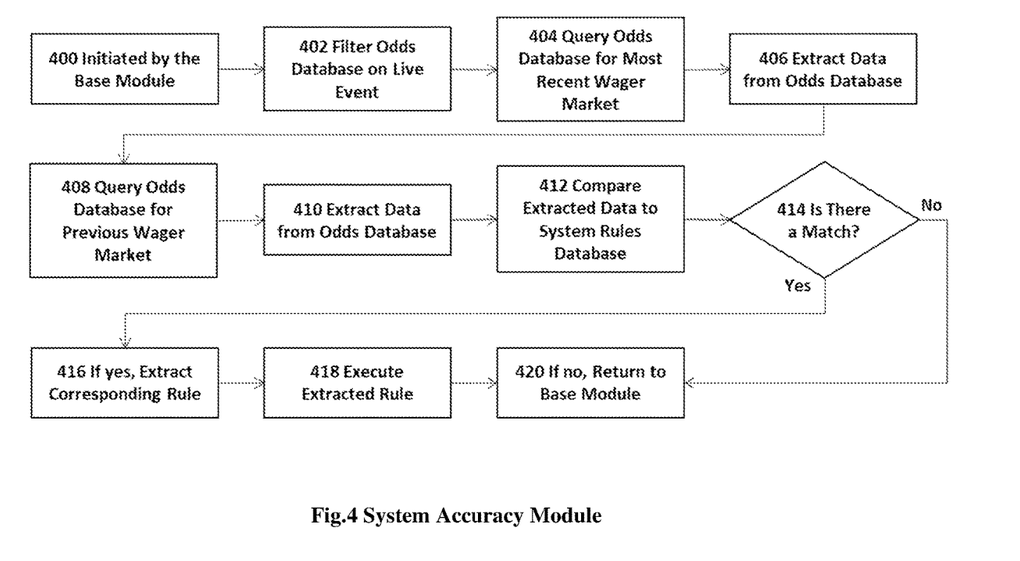
FIG. 4: illustrates a system accuracy module, according to an embodiment.

FIG. 4 illustrates the system accuracy module 128. The process may begin with the base module 124 initiating, at step 400, the system accuracy module 128. The system accuracy module 128 may filter, at step 402, the odds database 120 for the live event 102. For example, the system accuracy module 128 may filter the odds database 120 for the live event 102 of the Boston Red Sox vs. the New York Yankees. The system accuracy module 128 may query, at step 404, the odds database 120 for the most recent wager market or wager odds. For example, the system accuracy module 128 may query the odds database 120 for the most recent wager market, or the most recent odds offered on the live event 102, such as the in the second inning in the Boston Red Sox vs. the New York Yankees event with J. D. Martinez at-bat the fifth pitch was a ball which may result in the house or the wagering network 114 collecting $10,000. The system accuracy module 128 may extract, at step 406, the wager market data from the odds database 120. For example, the data extracted may be in the second inning in the Boston Red Sox vs. the New York Yankees event with J. D. Martinez at-bat, wherein the fifth pitch was a ball, resulting in the house or the wagering network 114 collecting $10,000. The system accuracy module 128 may query, at step 408, the odds database 120 for the previous wager market data. For example, the system accuracy module 128 may query the odds database 120 for the wager odds data for the wagering market before the most recent wager market or the second most recent data entry in the odds database 120. For example, the data may be in the second inning in the Boston Red Sox vs. the New York Yankees event with J. D. Martinez at-bat the fourth pitch was a ball which may result in the house or the wagering network 114 collecting $50,000. The system accuracy module 128 may extract, at step 410, the previous wager market data from the odds database 120. For example, the data extracted may be in the second inning in the Boston Red Sox vs. the New York Yankees event with J. D. Martinez at-bat the fourth pitch was a ball that resulted in the house or the wagering network 114 collecting $50,000. The system accuracy module 128 may compare, at step 412, the extracted wager market data to the system rules database 132. For example, the system accuracy module 128 may compare the two extracted data entries in which the difference is on the fourth pitch the house or wagering network 114 collected $50,000, and on the fifth pitch, the house collected $10,000 on the wagers for the pitch to be a ball, which may be a decrease of 80% in collections or profits for the house. The system accuracy module 128 may determine, at step 414, if there is a match between the extracted wager market data and the rules stored in the system rules database 132. For example, the difference between the two data entries is that the house profits decreased by 80%, so there may be a match between the two data entries and the data stored in the system rules database 132, which may result in the corresponding action to be extracted and executed. If there is a match, the system accuracy module 128 may extract, at step 416, the corresponding rule from the system rules database 132. For example, the difference between the two data entries is the house profits decreased by 80%, so there may be a match between the two data entries and the data stored in the system rules database 132, which may result in the corresponding action, such as the wagering market being suspended, and a system administrator being notified. The decrease in profits for the house or wagering network 114 may be because the wagering network 114 received incorrect or erroneous data used to create the odds thereby potentially resulting in inappropriate or incorrect wager odds that may either make the house lose profits drastically or allow the house to collect profits drastically which may lower user engagement due to a lack of trust in the system. The system accuracy module 128 may execute, at step 418, the extracted rule from the system rules database 132. For example, the corresponding action may be to suspend the wagering market and notify an administrator to correct the wager odds or check the system to ensure that the data being received from the live event 102 is correct and does not contain errors to prevent further drastically increased or decreased profits for the wagering network 114. If there is no match or after the extracted rule is executed, the system accuracy module 128 may return, at step 420, to the base module 124.

Figure 5:
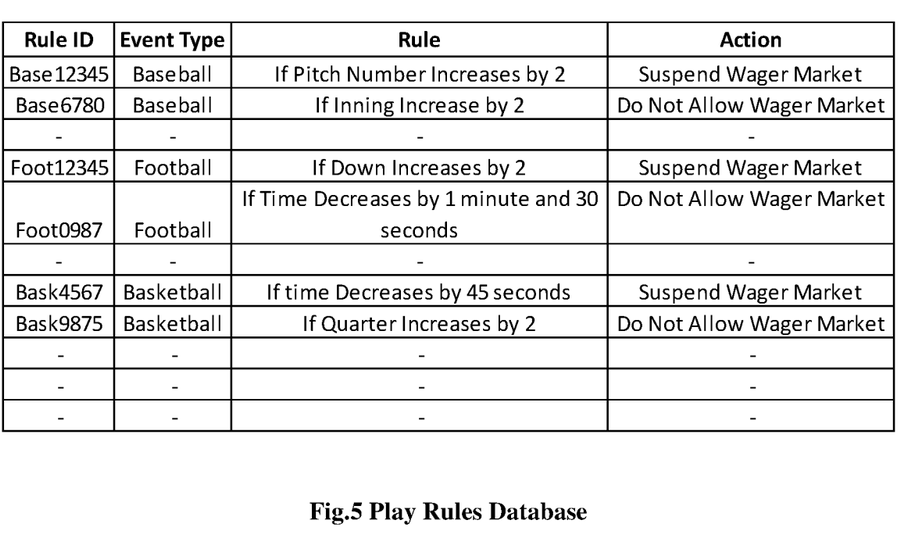
FIG. 5: illustrates a play rules database, according to an embodiment.

FIG. 5 illustrates the play rules database 130. The play rules database 130 may contain the rule ID, such as Base12354, the event type, such as baseball, the rule, such as if the pitch number increases by two, and the action, such as suspend the wagering market. The play rules database 130 may be used in the process described in the play accuracy module 126, wherein the two most recent plays from the live event 102 are extracted from the historical plays database 118 and compared to the play rules database 130 to determine if the two extracted data entries match any of the rules listed and if so, execute the corresponding action. This comparison may prevent the wagering network 114 from using data from the live event 102 that may be considered erroneous, leading to the creation of inappropriate or wrong wagering odds or wagering odds that do not fully represent the current state of the live event 102. In some embodiments, the play rules database 130 may contain data for multiple sports or events such as baseball, football, soccer, hockey, tennis, golf, etc. In some embodiments, the play rules database 130 may contain other rules or actions that limit or suspend wagering markets (or otherwise govern or control the wagering markets) until the data being received is deemed correct, or if there is a continuous stream of incorrect data, then the play rules database 130 may contain an action to inform or notify a system administrator to correct the data being received or perform some other action to correctly create wagering odds for the live event 102.

Figure 6:
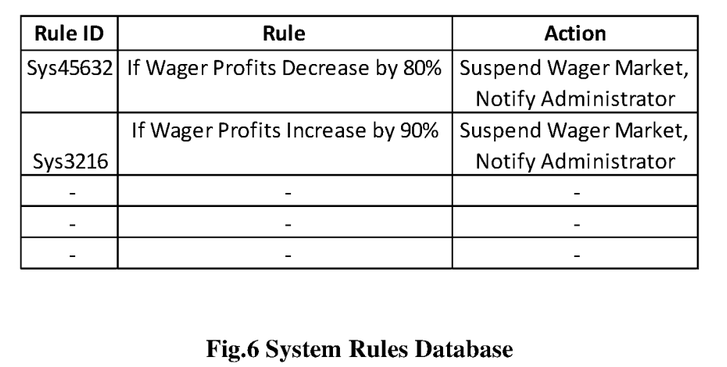
FIG. 6: illustrates a system rules database, according to an embodiment.

FIG. 6 illustrates the system rules database 132. The system rules database 132 may contain the rule ID, such as Sys45632, the rule, such as if wager profits decrease by 80%, and the action, such as suspend the wagering market and notify a system administrator, or other contain and execute a series of governing or controlling rules or actions. The system rules database 132 may be used in the process described in the system accuracy module 128, wherein the two most wager markets for the live event 102 are extracted from the odds database 120 and compared to the system rules database 132 to determine if the two extracted data entries match any of the rules listed and if so, execute the corresponding action. This comparison may prevent the wagering network 114 from using data from the live event 102 that may be considered erroneous, leading to the creation of inappropriate or wrong wagering odds or wagering odds that do not fully represent the current state of the live event 102. The system rules database 132 may contain rules based on potential system errors that may be caused by receiving incorrect or error-filled data from the live event 102 that may potentially have a drastic outcome on the profits or losses for the wagering network 114, which may lead to the wagering network 114 incorrectly losing large sums of profits or gaining profits incorrectly which may lead to mistrust with users and lead to less user engagement. In some embodiments, the system rules database 132 may contain other controlling rules or actions that limit or suspend wagering markets until the data being received is deemed correct, or if there is a continuous stream of incorrect data, then the system rules database 132 may contain an action to inform or notify a system administrator to correct the data being received or perform some other action to correctly create wagering odds for the live event 102.

The foregoing description and accompanying figures illustrate the principles, preferred embodiments, and modes of operation of the invention. However, the invention should not be construed as being limited to the embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of ensuring accuracy of calculated odds on a sports wagering network, the method comprising:
   filtering at least one database for live event data;
   extracting a most recent play from the at least one database;
   extracting a play prior to the most recent play from the at least one database, thereby extracting data entries for the two most recent plays from a live event;
   comparing the extracted data entries for the two most recent plays from the live event to a plurality of rules for suspending or not allowing a wager market from a play rules database;
   based upon the comparison, determining that the extracted data entries are erroneous;
   comparing extracted wager market data to system rule data from a system rules database;
   based upon the comparison, determining that the extracted wager market data are erroneous;
   based upon either comparison, suspending wager market activity on the sports wagering network; and
   displaying at least one message that either the extracted data entries are erroneous or the extracted wager market data are erroneous to a system administrator.

2. The method of ensuring accuracy of calculated odds on the sports wagering network of claim 1, further comprising:
   initiating, with a base module, a play accuracy module and a system accuracy module.

3. The method of ensuring accuracy of calculated odds on the sports wagering network of claim 1, further comprising:
   regulating the wager market activity by recognizing a change in live event play data through predetermined thresholds.

4. The method of ensuring accuracy of calculated odds on the sports wagering network of claim 1, further comprising:
   regulating the wager market activity by recognizing a change in wager profit data through predetermined thresholds.

5. The method of ensuring accuracy of calculated odds on the sports wagering network of claim 1, wherein the at least one displayed message instructs the system administrator to verify validity of wager odds or live event data through manual review.

6. The method of claim 1, wherein both of the determining steps are performed in real time.

7. A system for ensuring accuracy of calculated odds on a sports wagering network, the system comprising:
   a play rules database configured to store a plurality of rules for suspending or not allowing a wager market;
   a play accuracy module configured to compare extracted play data with the plurality of rules for suspending or not allowing a wager market from the play rules database and determine that the extracted play data are erroneous;
   a system rules database configured to store system rule data;
   a system accuracy module configured to compare extracted wager market data with the system rule data from the system rules database and determine that the extracted wager market data are erroneous;
   a base module configured to initiate the play accuracy module and the system accuracy module, wherein, based upon either comparison, wager market activity on the sports wagering network is suspended; and
   a device configured to display a message that either the extracted data entries are erroneous or the extracted wager market data are erroneous to a system administrator.

8. The system for ensuring accuracy of calculated odds on the sports wagering network of claim 7, wherein the play accuracy module is further configured to filter, query, compare, and extract data from the play rules database.

9. The system for ensuring accuracy of calculated odds on the sports wagering network of claim 8, wherein the play rules database is configured to contain rules based on potential system errors data is at least one of historical, recent, or previous play data.

10. The system for ensuring accuracy of calculated odds on the sports wagering network of claim 7, wherein the system accuracy module is further configured to filter, query, compare, and extract data from the system database.

11. The system for ensuring accuracy of calculated odds on the sports wagering network of claim 10, wherein the system rules database is configured to contain rules based on potential system errors.

12. The system for ensuring accuracy of calculated odds on the sports wagering network of claim 7, wherein the extracted and executed rules are configured to utilize a predetermined threshold.

13. The system for ensuring accuracy of calculated odds on the sports wagering network of claim 12, wherein the predetermined threshold is configured to be at least one predetermined number, time interval, or percentage.

14. The system for ensuring accuracy of calculated odds on the sports wagering network of claim 7, wherein the play rules database is configured to contain rules based on potential system errors.

15. The system for ensuring accuracy of calculated odds on the sports wagering network of claim 7, wherein the system rules database is configured to contain rules based on potential system errors.

16. The system for ensuring accuracy of calculated odds on the sports wagering network of claim 7, wherein the message is displayed to an administrator by a notification.

17. The system of claim 7, wherein the play accuracy module and the system accuracy module are both configured to perform respective determinations in real time.

* * * * *